United States Patent
Rudaitis et al.

(10) Patent No.: US 11,392,519 B2
(45) Date of Patent: Jul. 19, 2022

(54) METHOD AND APPARATUS FOR CONFIGURING I/O MODULES CONNECTED TO A FIELDBUS CONTROLLER

(71) Applicant: Parker-Hannifin Corporation, Cleveland, OH (US)

(72) Inventors: Erick Rudaitis, Sterling Heights, MI (US); Krishna Chandra Moulik, Bangalore (IN); Shameer Padinhare Kandi Meethal, Kalamazoo, MI (US); Sachin Vithoba Naik, Bangalore (IN)

(73) Assignee: Parker-Hannifin Corporation, Cleveland, OH (US)

( * ) Notice: Subject to any disclaimer, the term of this patent is extended or adjusted under 35 U.S.C. 154(b) by 37 days.

(21) Appl. No.: 16/960,646

(22) PCT Filed: Jan. 29, 2019

(86) PCT No.: PCT/US2019/015534
§ 371 (c)(1),
(2) Date: Jul. 8, 2020

(87) PCT Pub. No.: WO2019/152348
PCT Pub. Date: Aug. 8, 2019

(65) Prior Publication Data
US 2020/0364166 A1 Nov. 19, 2020

Related U.S. Application Data

(60) Provisional application No. 62/623,730, filed on Jan. 30, 2018.

(51) Int. Cl.
*G06F 13/20* (2006.01)
*G08B 5/36* (2006.01)

(52) U.S. Cl.
CPC ............... *G06F 13/20* (2013.01); *G08B 5/36* (2013.01)

(58) Field of Classification Search
CPC .................. G06F 13/20; G08B 5/36
See application file for complete search history.

(56) References Cited

U.S. PATENT DOCUMENTS 6,226,762 B1 5/2001 Foote et al.
8,949,665 B2 * 2/2015 Law ................... H04L 25/0278
714/22

(Continued)

FOREIGN PATENT DOCUMENTS

| CN | 204 256 481 | 4/2015 |
| JP | H10233668 | 9/1998 |
| JP | 2010-239202 | 10/2010 |

OTHER PUBLICATIONS

Search Report and Written Opinion issued by WIPO for corresponding International Patent Application PCT/US2019/015534 dated Jul. 16, 2019.

*Primary Examiner* — Henry Tsai
*Assistant Examiner* — Christopher A Daley
(74) *Attorney, Agent, or Firm* — Renner, Otto, Boisselle & Sklar, LLP (57) ABSTRACT

A method of determining a configuration state of an I/O module connected to a fieldbus controller is disclosed, the method comprising the steps of receiving from the I/O module a key ID, comparing the key ID with at least one key ID stored on the fieldbus controller, and configuring the I/O module when the received key ID does not correspond to the at least one stored key ID stored. Further, a circuit for configuring a digital input of a fieldbus controller as either a PNP input or an NPN input is provided comprising a control circuit including a reference input, a first selection input, and a control output. The circuit also comprises a data (Continued)

circuit including a second selection input electrically connected to the control output, a data input electrically coupled to the digital input, and a data output.

16 Claims, 11 Drawing Sheets

(56) References Cited

U.S. PATENT DOCUMENTS

| | | | |
|---|---|---|---|
| 10,148,082 B2* | 12/2018 | Nikam | H02H 3/20 |
| 10,764,083 B2* | 9/2020 | Benson | H04B 3/548 |
| 2002/0184410 A1* | 12/2002 | Apel | G06F 11/0745 |
| | | | 710/5 |
| 2008/0048496 A1* | 2/2008 | Fisher | H01R 9/2425 |
| | | | 307/18 |
| 2009/0172223 A1 | 7/2009 | Lee et al. | |
| 2012/0221155 A1* | 8/2012 | Miles | G05B 19/0423 |
| | | | 700/286 |
| 2012/0229079 A1* | 9/2012 | Chin | H01R 4/4818 |
| | | | 320/107 |
| 2015/0347161 A1 | 12/2015 | Kretschmann et al. | |
| 2017/0350401 A1* | 12/2017 | Lockwood | G05B 19/0423 |
| 2021/0064562 A1* | 3/2021 | Huehn | G06F 13/4221 |
| 2021/0081346 A1* | 3/2021 | Nixon | G06F 1/26 |

* cited by examiner

METHOD AND APPARATUS FOR CONFIGURING I/O MODULES CONNECTED TO A FIELDBUS CONTROLLER

RELATED APPLICATIONS

This application is a national phase of International Application No. PCT/US2019/015534 filed Jan. 29, 2019 and published in the English language, which claims benefit of U.S. Provisional Patent Application No. 62/623,730 filed on Jan. 30, 2018, the contents of which are incorporated here by reference.

TECHNICAL FIELD

This invention relates to the use of fieldbus controllers in an industrial factory network, and more particularly to a method and apparatus for determining the configuration state of connected I/O modules on a fieldbus controller and configuring a digital input of a fieldbus controller.

BACKGROUND

In an industrial factory network system, fieldbus controllers are used at the bottom of a control chain in order to link a user interface and a programmable logic controller (PLC) to a plurality of instruments that actually carry out the work, such as sensors, actuators, electric motors, valve assemblies, etc. Fieldbus controllers typically contain a plurality of configurable I/O modules for connection to and control of these instruments. In complex industrial factory networks, many I/O modules on a single fieldbus controller may be connected for use at one time and may each have different configuration settings. Accordingly, when each I/O module is connected for use, appropriate identification, configuration and boot-up processes occur.

Typically, when an I/O module is first connected on a fieldbus controller, two time-consuming processes take place to configure and boot-up the I/O module. First, the connected I/O module is uniquely identified by the fieldbus controller. As mentioned, a number of I/O modules may be connected for use at one time, each I/O module having different configuration settings. Conventional systems identify connected I/O modules with sequential number identification (ID) so that when all I/O modules are connected, they are guaranteed to have unique IDs. This means that when any new I/O module is connected for use, the new I/O module first communicates with the other connected I/O modules on the fieldbus controller, for example, to ensure that the new I/O module receives a unique number ID and that all connected I/O module IDs are in sequential order, potentially requiring reassignment of IDs. Secondly, after receiving an appropriate ID, the I/O module communicates its configuration settings and/or safety information, including, for example, its model and serial number, to the fieldbus controller. These time-consuming processes make the configuration and boot-up time of the connected I/O module lengthy. Especially in complex industrial networks, where a large number of I/O modules are connected for use, these lengthy configuration and boot-up times may be at odds with various time constraints, such as industry specifications or qualifications.

Additionally, conventional fieldbus controllers are configured with only a single type of sensor interface for digital inputs and are only capable of detecting signals from either a PNP input or an NPN input. Fieldbus controllers are manufactured as either NPN sensor input devices or PNP sensor input devices, but do not currently have the capability to configure the input as either NPN or PNP sensor inputs. In complex industrial networks, however, many different sensor types are used. This means that many different fieldbus controllers configured for each type must be used in order to accommodate the different sensor types and different communication protocols to transmit and communicate the sensor data information over the industrial network.

SUMMARY

The present invention provides a method for a faster configuration and boot-up procedure for connected I/O modules on a fieldbus controller. The present invention uses an assigned key ID (e.g., a 4-byte random key ID) for connected I/O modules when they are first configured so that configuration settings may be more quickly identified and obtained with any subsequent connection. When an I/O module is connected and the key ID of the I/O module matches with at least one of a plurality of key IDs stored on the fieldbus controller, the fieldbus controller knows that the I/O module has already been configured. When the key ID of the I/O module does not match with at least one of a plurality of key IDs stored on the fieldbus controller, however, the fieldbus controller knows that the I/O module has not previously been configured and will assign the I/O module a key ID. The present invention also provides circuitry for configuring a digital input of a fieldbus controller as either a PNP input or an NPN input and allowing detection of either type of input.

According to one aspect of the disclosure, a method for determining a configuration state of an I/O module connected to a fieldbus controller via a communication link is provided. The method comprises the step of receiving from the I/O module via the communication link a key ID. Upon receiving the key ID, the key ID is compared with at least one key ID stored on the fieldbus controller. The method then includes configuring the I/O module when the received key ID does not correspond to the at least one key ID stored on the fieldbus controller.

According to one embodiment, the configuring step includes generating by the fieldbus controller a new key ID, communicating the new key ID to the I/O module, and storing the new key ID on the fieldbus controller and the I/O module.

According to one embodiment, when the received key ID corresponds to the at least one key ID stored on the fieldbus controller, the method further comprises concluding the I/O module is configured.

According to one embodiment, the method further includes completing a boot-up procedure of the I/O module.

According to one embodiment, the key ID comprises 4-bytes.

According to one embodiment, the communication link comprises a controller area network line.

According to another aspect of the disclosure, a circuit for configuring a digital input of a fieldbus controller as either a PNP input or an NPN input is provided. The circuit comprises a control circuit including a reference input for receiving a reference voltage. The control circuit also comprises a first selection input for selecting between NPN mode and PNP mode of the digital input, wherein a state of the first selection input controls a voltage provided at the reference input, and a control output for providing a command indicative of either NPN mode or PNP mode, wherein the command provided by the control output corresponds to a voltage provided at the reference input. The circuit further comprises a data circuit including a second selection input electrically connected to the control output for receiving the command provided by the control output, wherein the second selection input is operative to configure the digital input as either a PNP input or an NPN input, depending on the command received by the control output. The data circuit also includes a data input electrically coupled to the digital input, and a data output for providing data corresponding to the data input. The control output is operative to connect the second selection input to one of a first voltage level or a second, different voltage level.

According to one embodiment, the first voltage level comprises signal common and the second voltage level comprises a prescribed voltage different from signal common.

According to one embodiment, the data circuit comprises a first optocoupler.

According to one embodiment, the first optocoupler comprises a first light emitting device connected between the data input and the second selection input, the first light emitting device operative to selectively emit light based on data provided on the data input.

According to one embodiment, the first light emitting device comprises a first light emitting diode having an anode connected to the data input and a cathode connected to the second selection input, and a second light emitting diode having an anode connected to the second selection input and a cathode connected to the data input.

According to one embodiment, the first optocoupler comprises a first phototransistor connected to the data output and signal common, wherein the first phototransistor selectively couples the data output to signal common based on light emitted from the first light emitting device.

According to one embodiment, the circuit further comprises a first power source, a first resistor connected between the first power source and the data output and a second resistor connected between the data input and the digital input.

According to one embodiment, the circuit further comprises a second power source, a third resistor connected between the second power source and the control output and a fourth resistor connected between the reference input and the first power source.

According to one embodiment, the control circuit comprises a second optocoupler.

According to one embodiment, the second optocoupler comprises a second light emitting device connected between the reference input and the first selection input, the second light emitting device operative to selectively emit light based on data provided on the reference input.

According to one embodiment, the second light emitting device comprises a light emitting diode having an anode connected to the reference input and a cathode connected to the first selection input.

According to one embodiment, the second optocoupler comprises a second phototransistor connected to the control output and signal common, wherein the second phototransistor selectively couples the control output to signal common based on light emitted from the second light emitting device.

The foregoing and other features of the invention are hereinafter described in greater detail with reference to the accompanying drawings.

BRIEF DESCRIPTION OF THE DRAWINGS

Embodiments of this invention will now be described in further detail with reference to the accompanying drawing, in which.

DETAILED DESCRIPTION OF THE DRAWINGS

Embodiments will now be described with reference to the drawings, wherein like reference numerals are used to refer to like elements throughout. It will be understood that the figures are not necessarily to scale. Further, features that are described and/or illustrated with respect to one embodiment may be used in the same way or in a similar way in one or more other embodiments and/or in combination with or instead of the features of the other embodiments.

Described below in conjunction with the appended figures are various embodiments of an industrial factory network system including a fieldbus controller having a plurality of I/O modules. In one aspect of the invention, a method of determining a configuration state and/or configuring a connected I/O module on the fieldbus controller is provided. In another aspect of the invention, circuitry for configuring a digital input of a fieldbus controller as a PNP input or an NPN input is provided.

Figure 1A:
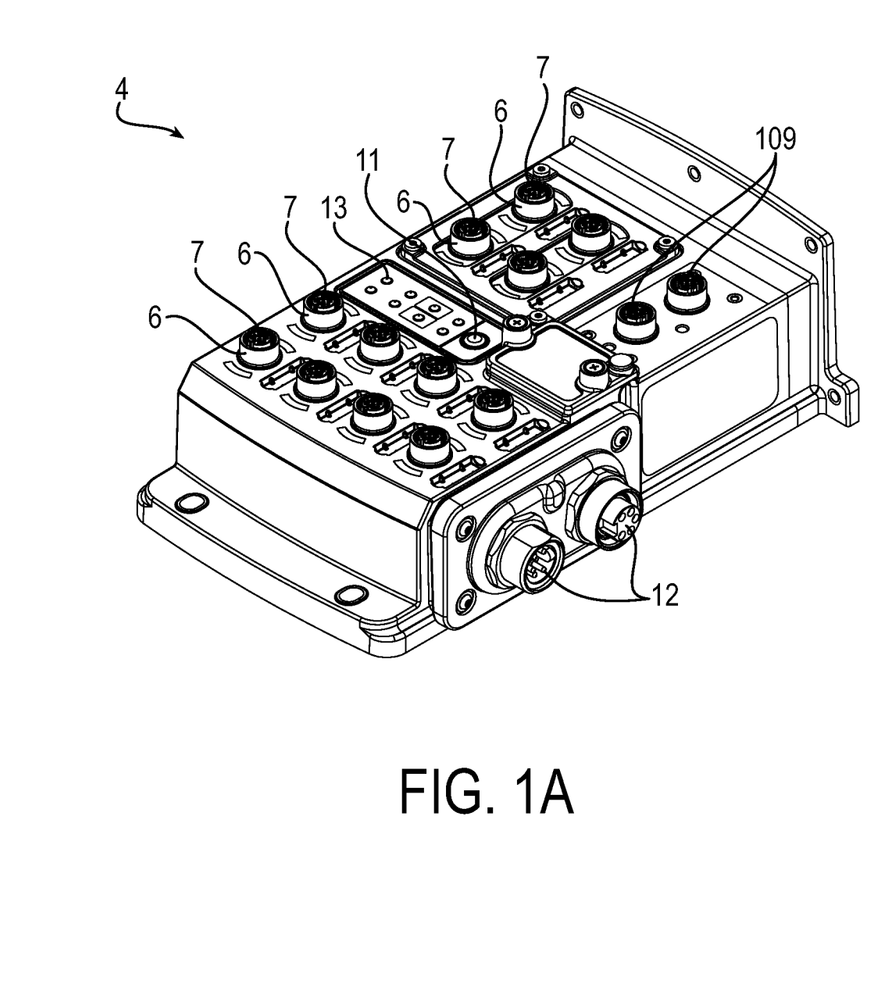
FIG. 1A is a perspective view of an exemplary fieldbus controller.
Figure 1B:
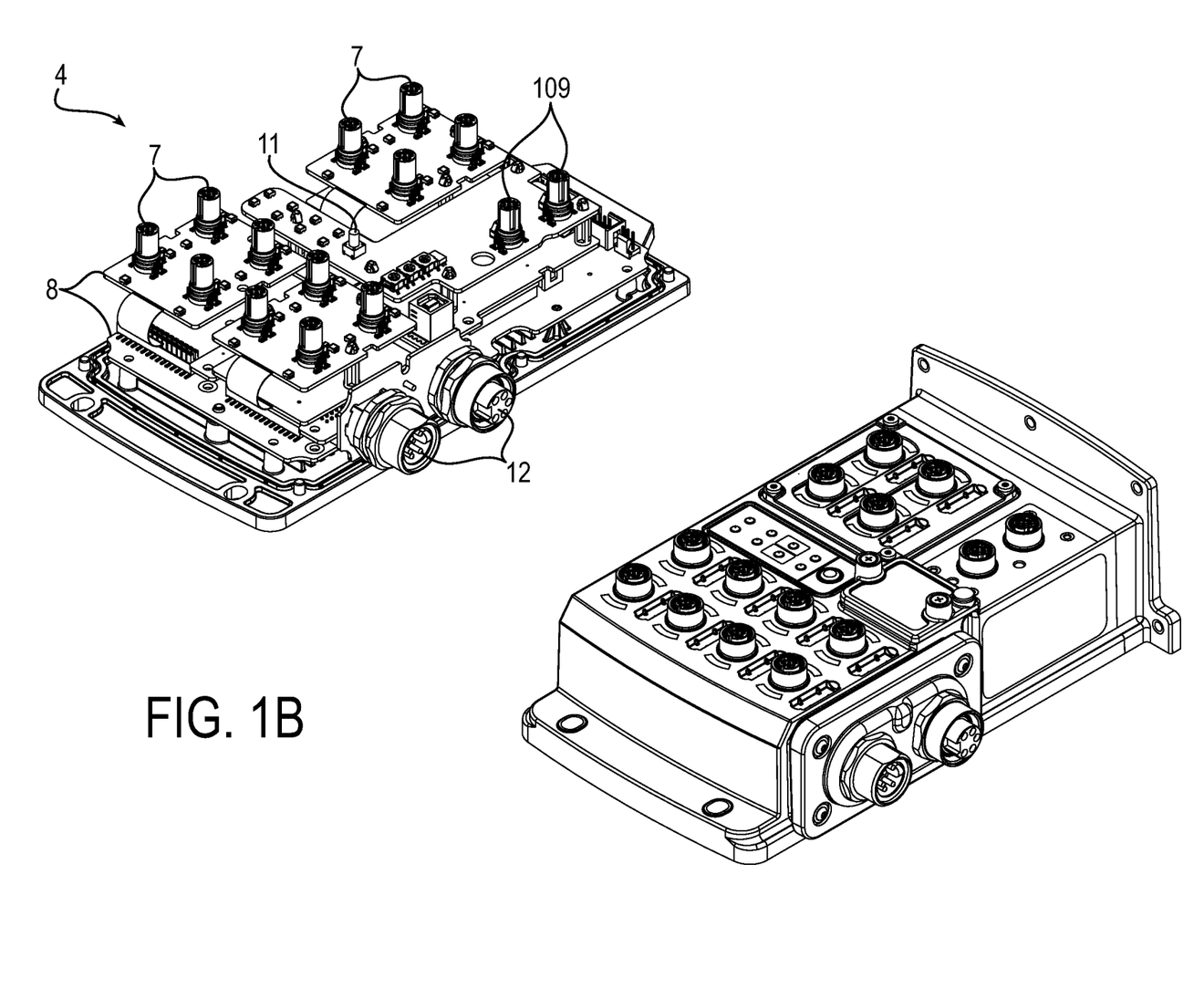
FIG. 1B is an exploded view of an exemplary fieldbus controller.
Figure 1C:
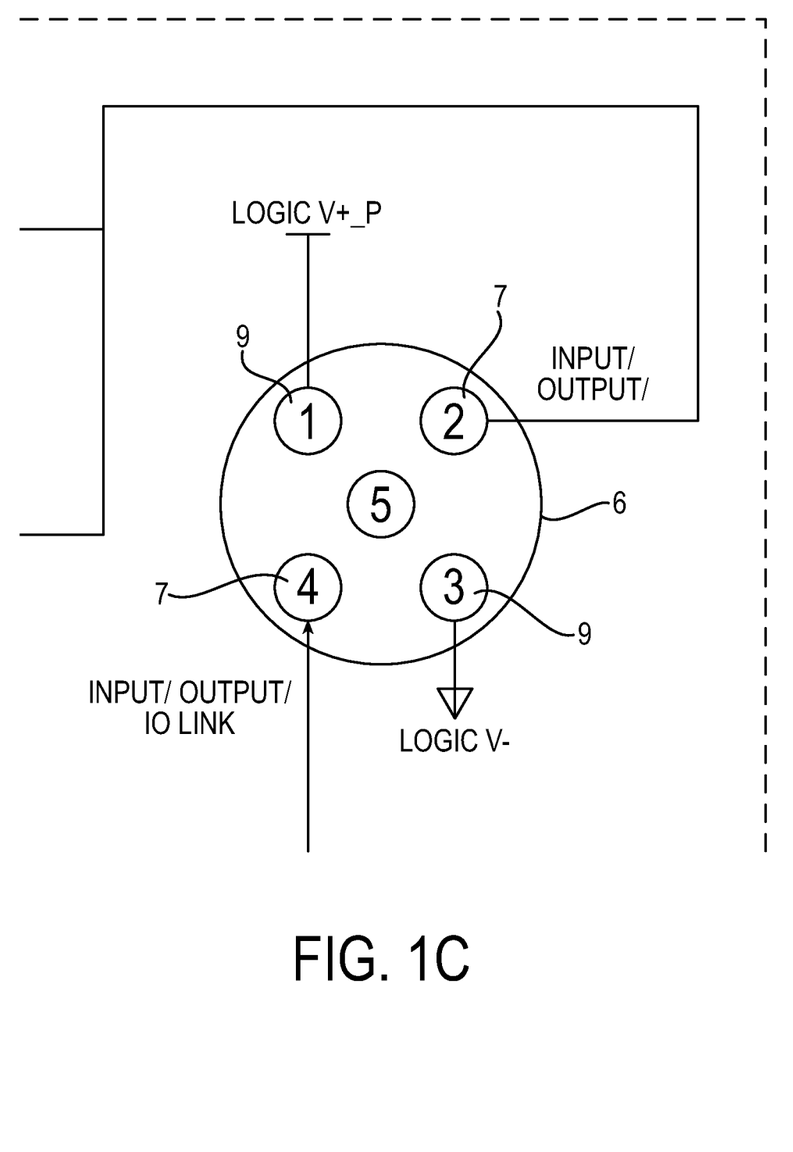
FIG. 1C is a schematic diagram of an I/O connector.

With reference to FIGS. 1A-C, an exemplary fieldbus controller 4 used in an industrial factory network system is illustrated. The fieldbus controller 4 may have a plurality of I/O modules 8 with a plurality of I/O connectors 6, for example, threaded connectors, through which the I/O modules 8 may be connected to instruments within the industrial factory network. The I/O modules 8 may be configured as digital inputs, digital outputs, analog inputs, analog outputs, or may otherwise be configured for suitable connection with other instruments. Each I/O module 8 is capable of being configured according to its desired purpose. For example, as will be described later in respect to an embodiment of the invention, an I/O module 8 may have circuitry enabling configuration of a digital input as either a PNP input or an NPN input. In the exemplary embodiment, each I/O module 8 has four connectors 6 and each connector 6 has two configurable I/O pins 7 and a plurality of other pre-assigned pins 9, such as for example, to power and signal common. Each I/O pin 7, therefore, may be configured as either a PNP input or an NPN input. The fieldbus controller 4 may also include network connector ports, such as Ethernet ports 109, as well as power connectors 12. The fieldbus controller 4 may also have a Bluetooth switch 11 and LED indicators 13.

The power connectors 12 may be customizable and capable of receiving multiple types of power connections. This gives the user the ability to choose different power board configurations depending on the type of power being used. Auxiliary and logic power may be supplied through an aux power board and may run through replaceable fuses. The nominal power supply voltage for logic and aux power may be 24 VDC. The logic and aux power can have an inrush current less than 2 A at the minimum and maximum voltage range. The aux power supply board may have the following connectors depending on the board configuration: 4 pin, 7/8 type male or 5 pin (4+1PE) connector for supply IN; 4 pin, 7/8 type female or 5 pin (4+1PE) connector for supply OUT. The aux and logic power may have EMI filters and reverse voltage protection. A mechanical enclosure may be made with or without an AIDA connector. The enclosure may have provisions for the 7/8 mini power connector, fitted to the enclosure providing power to the block.

Figure 2A:
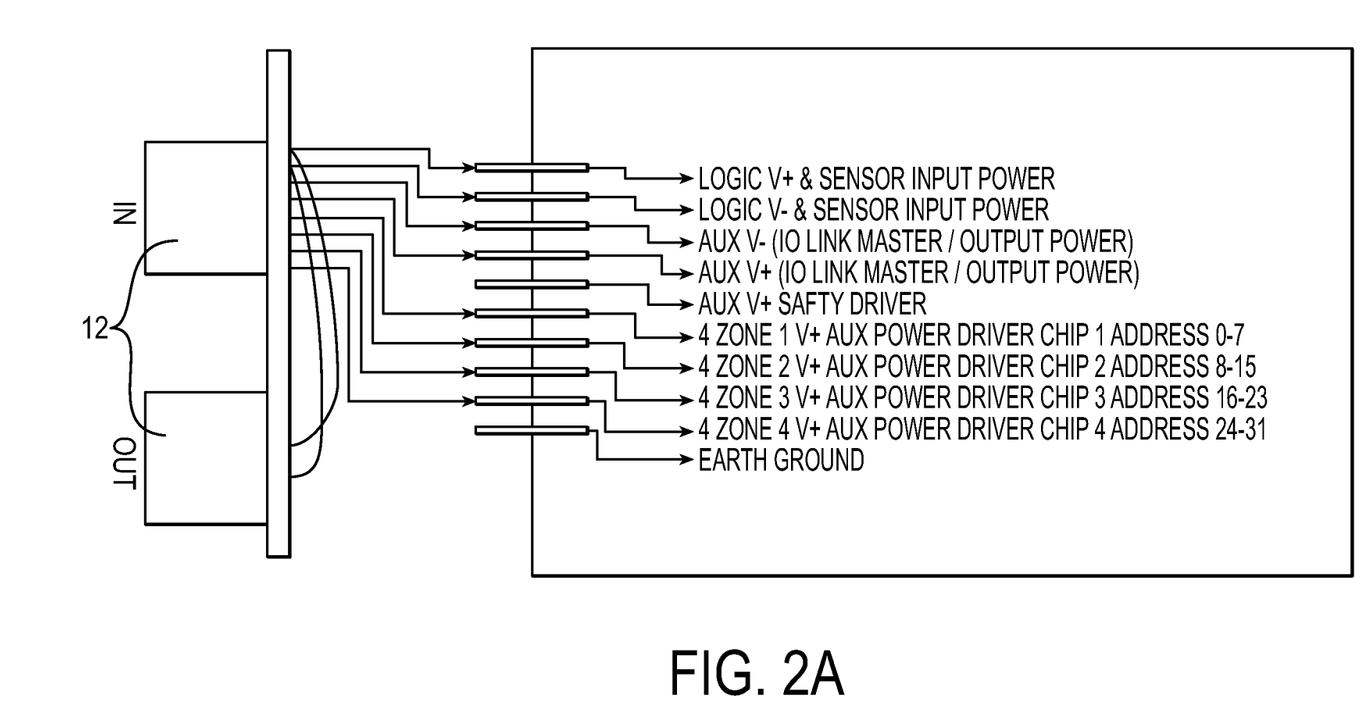
FIGS. 2A-D are schematic diagrams illustrating various power module configurations on an exemplary fieldbus controller.
Figure 2B:
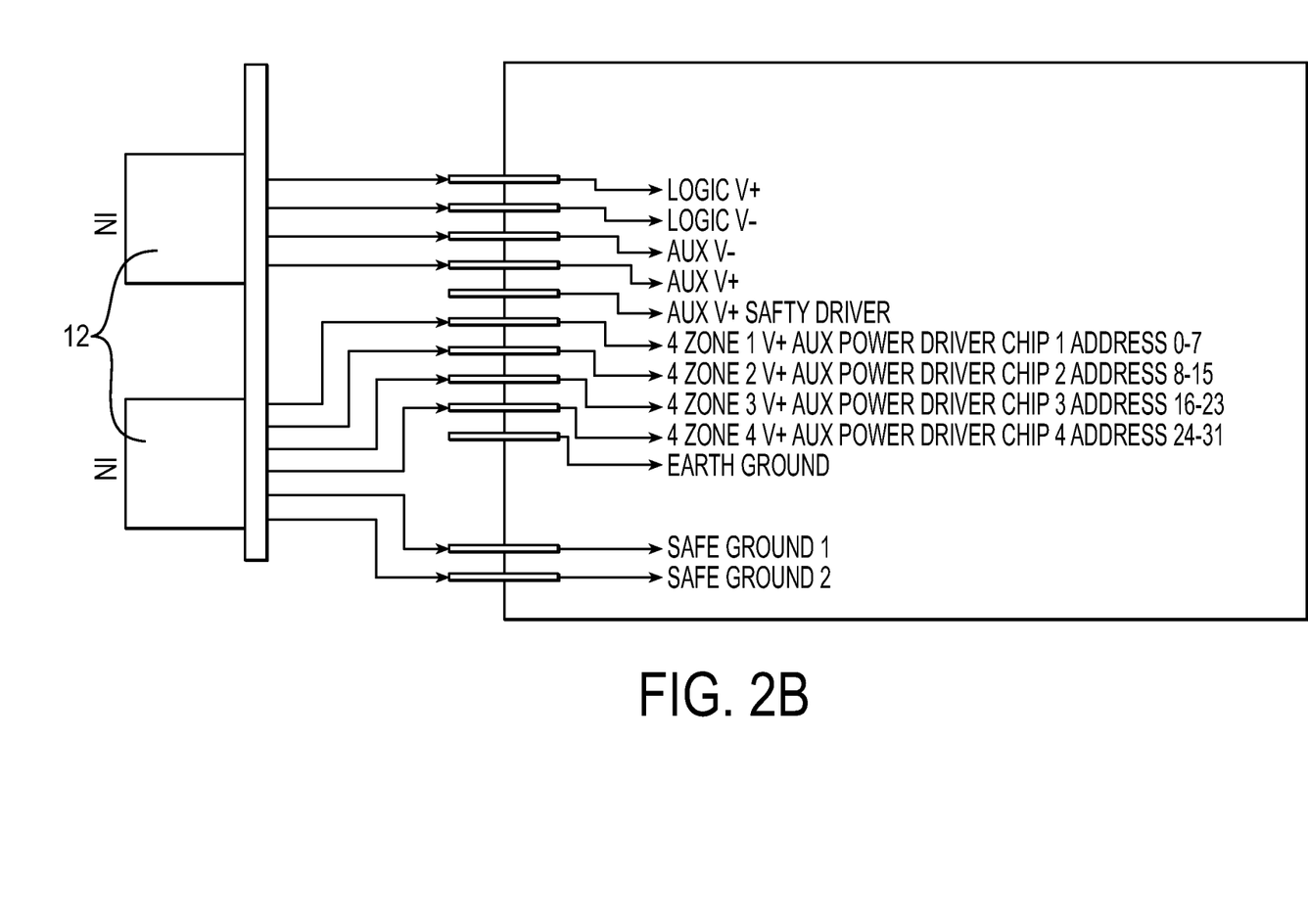
Figure 2C:
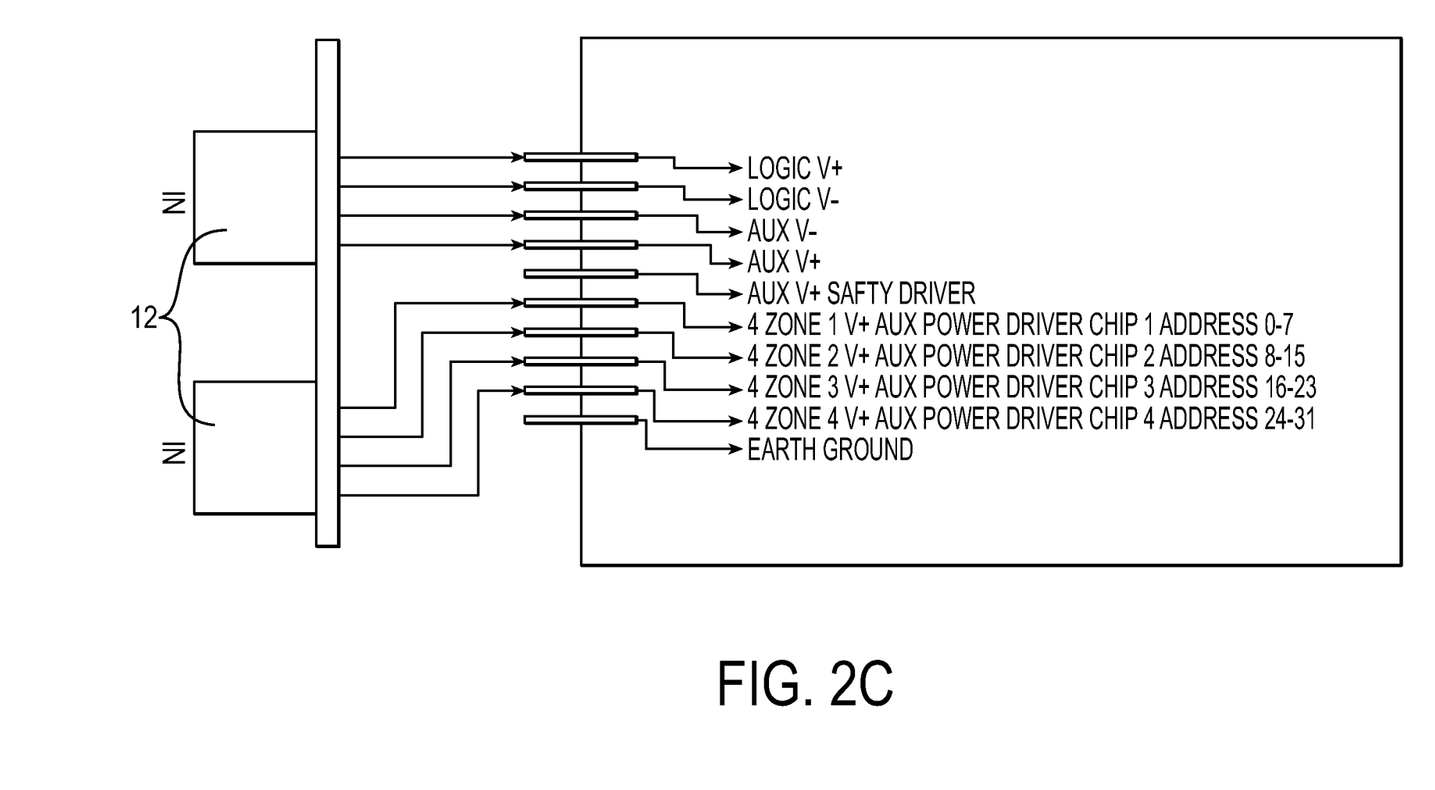
Figure 2D:
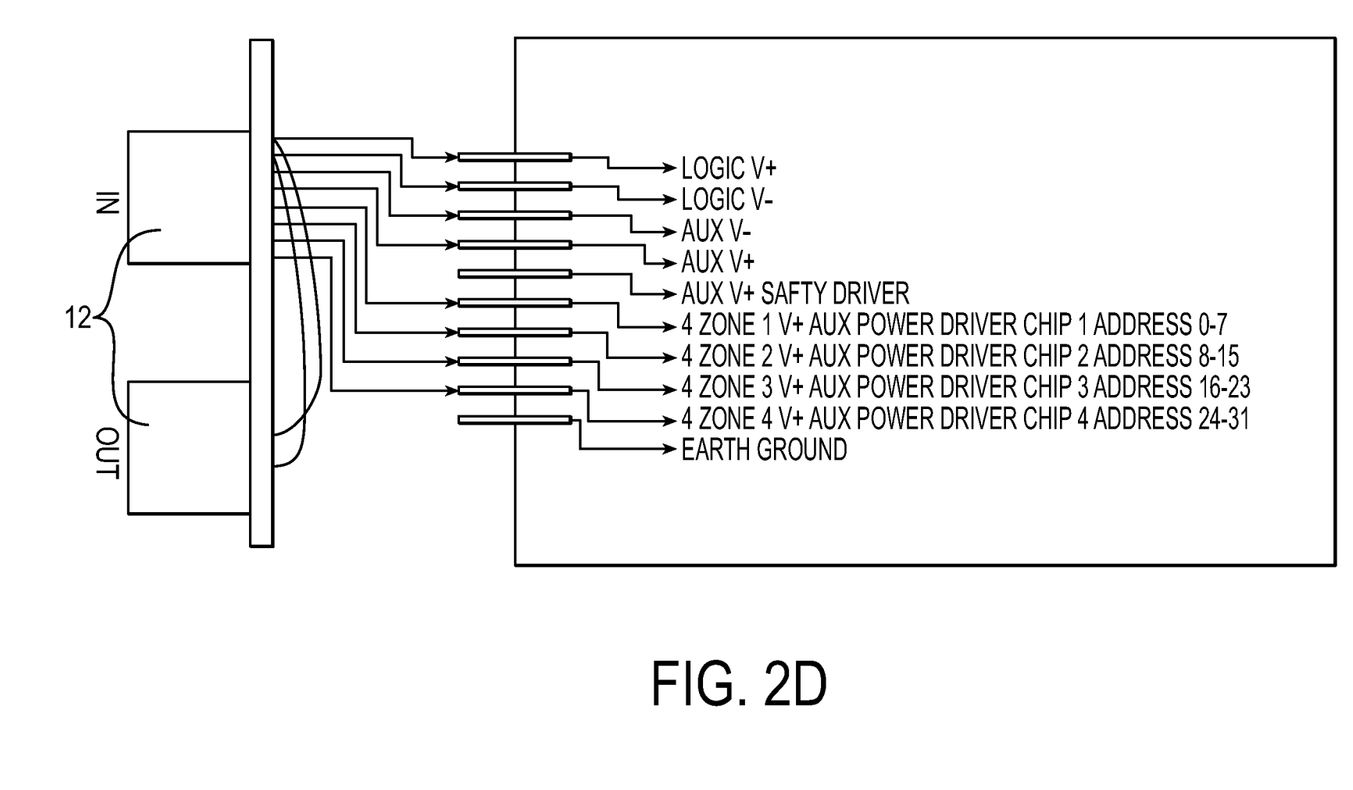

There may be, for example, seven different configurations of the power board supplying power to the fieldbus controller and connected modules, labelled A, B, C, D, E, F, and J. These seven configurations may be paired in the following ways for power distribution: A&B, C&D, E&F and J. FIGS. 2A-2D depict schematic diagrams showing the four exemplary types of board combinations using configurations A-J. FIG. 2A depicts a power board combination of configurations A&B. The aux power board configuration A&B may have two variants with different types of power connectors: power board A with 4 pin mini and power board B with 5 pin mini. FIG. 2B depicts a power board combination of configurations C&D. The board configuration C&D may have two variants with different types of power connectors: power board C with 4 pin mini and power board D with 5 pin mini. FIG. 2C depicts a power board combination of configurations E&F. The board configuration E&F may have two variants with different types of power connectors: power board E with 4 pin mini and power board F with 5 pin mini. FIG. 2D depicts a power board configuration J with 5 pin AIDA connector. In each configuration, the board may have protective fuses and filters for aux power, logic supply and valve driver supply. Providing a fieldbus controller 4 with these options for power module configurations add value to the user by adaptability and customization. Also, adding protective fuses provide an extra level of protection for the system.

Figure 3:
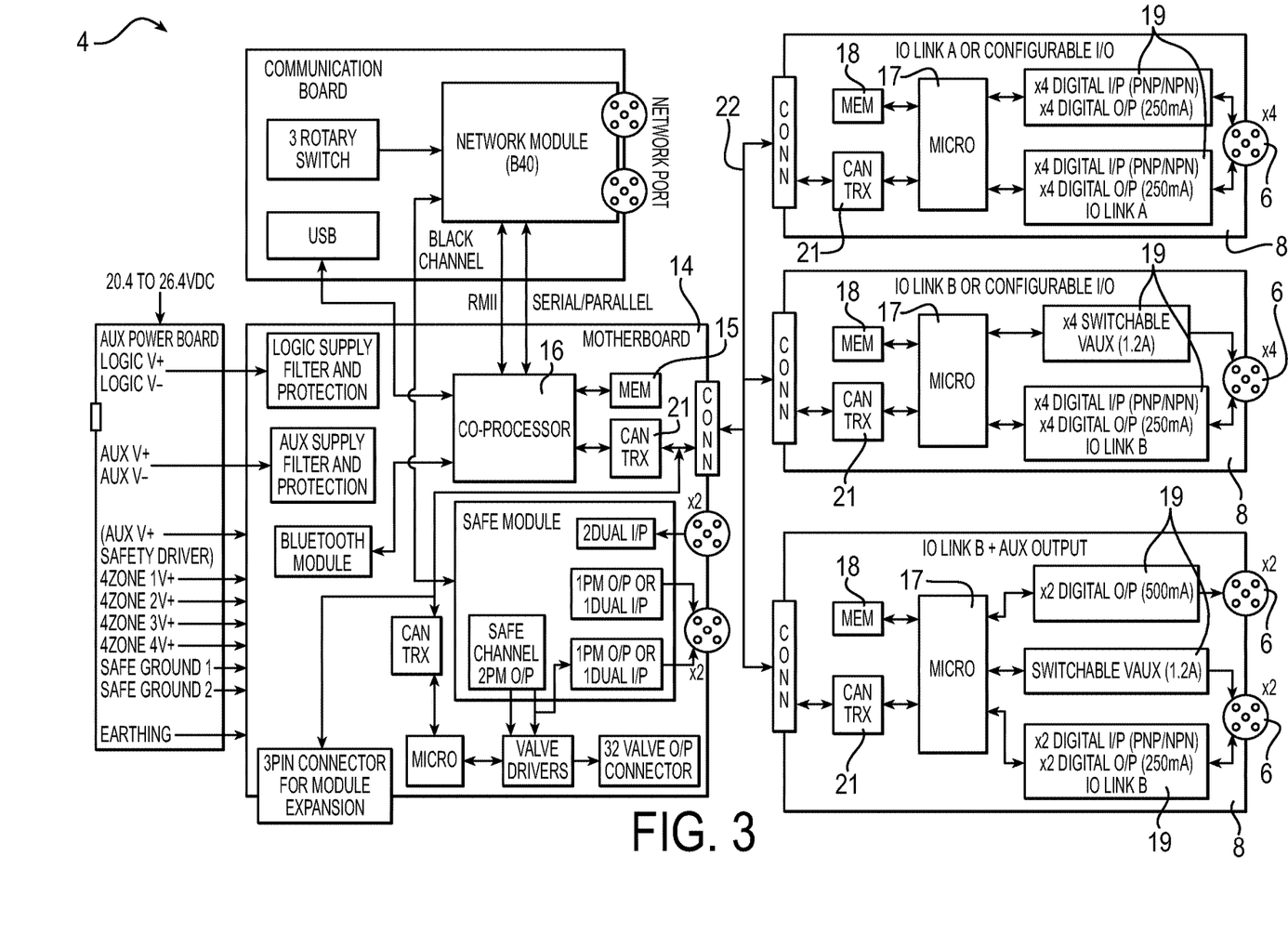
FIG. 3 is a schematic block diagram of an exemplary fieldbus controller connected to a plurality of I/O modules.

FIG. 3 depicts a schematic block diagram of an exemplary fieldbus controller 4 having a plurality of I/O modules 8. The exemplary fieldbus controller 4 may include a control circuit 14 that is responsible for overall operation of the fieldbus controller 4. The control circuit 14 may be, for example a logic board in the fieldbus controller 4. In one embodiment, the control circuit 14 of the fieldbus controller 4 includes a processor 16 that executes operating instructions. The processor 16 of the control circuit 14 may be a central processing unit (CPU), a microcontroller, or a microprocessor that executes code to carry out operation of the fieldbus controller 4. The fieldbus controller 4 may also include memory 15. The memory 15 may be, for example, one or more of a buffer, a flash memory, a hard drive, a removable media, a volatile memory, a non-volatile memory, a random access memory (RAM), or other suitable device. In a typical arrangement, the memory 15 includes a non-volatile memory for long term data storage and a volatile memory that functions as a system memory for the control circuit 14. The memory 15 may store a user interface in the form of an application and/or webpage and may exchange data with the control circuit 14 over a data bus. Accompanying control lines and an address bus between the memory 15 and the control circuit 14 also may be present. The memory 15 is considered a non-transitory computer readable medium.

The plurality of I/O modules 8 may include a module processor 17, a module memory 18, and other configuration circuitry 19. The I/O connectors 6 are connected to the module processor 17 and transmit data to the processor 16 of the control circuit 14 via a communication link 22 (e.g. CAN line) using a communication interface 21 (e.g. CAN TRX). For example, the processor 16 may use a backplane protocol for a backplane CAN driver to communicate with the I/O modules over the communication link 22.

When I/O modules 8 are first connected to the fieldbus controller 4, they communicate, for example, their identity and configuration settings to the processor 16 of the fieldbus controller 4 over the communication link 22. If the I/O modules 8 had not previously been connected to the fieldbus controller 4 and/or configured, then the fieldbus controller 4 performs a configuration process for the I/O module 8. Once configured, the I/O modules 8 may then boot-up and be used accordingly.

In accordance with the present invention, when configuration of an I/O module 8 is completed, a key ID is generated by the processor 16 of the fieldbus controller 4 (e.g., a random number generator may generate a random 4-byte number). As described below, the key ID is used to determine if the I/O module 8 had previously been configured. A random 4-byte number generator allows for $2^{32}$ possible different key IDs, ensuring that each generated key ID will be unique. The new key ID may be communicated from the processor 16 to the I/O module 8 via the communication link 22.

The key ID is saved, along with, for example, the configuration settings, in memory 15, 18 of both the fieldbus controller 4 and the I/O module 8. Upon connection of an I/O module 8 to the fieldbus controller 4 and/or upon system power up, the fieldbus controller 4 obtains the key ID stored in the I/O module 8 and compares the retrieved key ID to a key ID stored in memory 15 of the fieldbus controller 4 for the particular I/O module 8. If the key IDs match, then the fieldbus controller 4 knows the I/O module 8 has already been configured and no further configuration is necessary. In this manner, configuration and boot-up time may be reduced as the fieldbus controller 4 will immediately recognize the key ID and retrieve the particular configuration settings for that I/O module 8. If the key IDs do not match (or if the key ID is not present in either the fieldbus controller 4 or the I/O module 8), then a configuration process for the I/O module 8 is performed. As used herein, the term "connected" includes detecting a connection when an I/O module 8 is connected to an active network and/or an active fieldbus controller 4 as well as detecting a connection when the fieldbus controller 4, the network and/or the I/O modules 8 are powered up.

Figure 4:
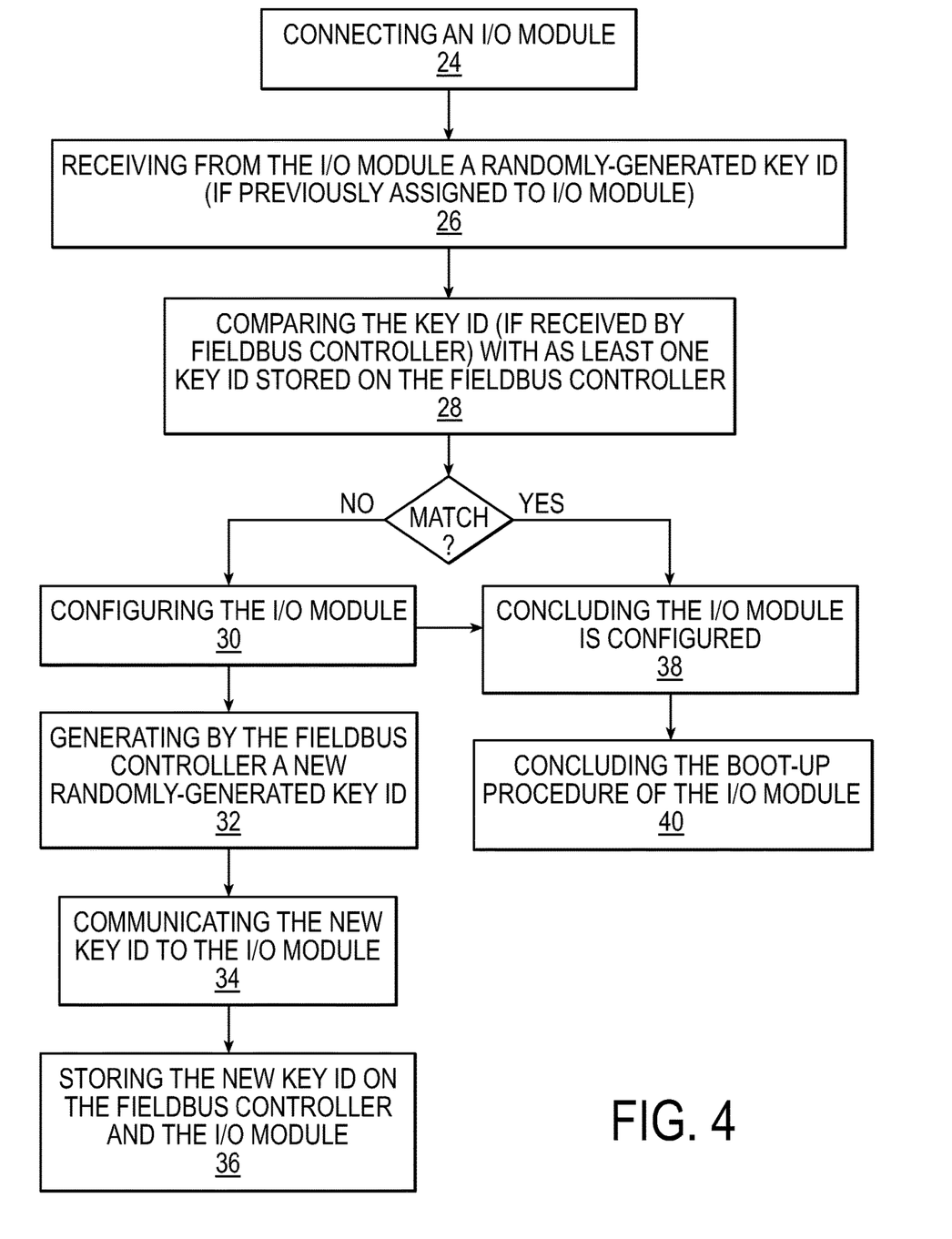
FIG. 4 is a flowchart of an exemplary method of determining a configuration state of an I/O module connected to a fieldbus controller via a communication link in accordance with the invention.

Accordingly, in an aspect of the invention, a method for determining a configuration state of an I/O module 8 connected to the fieldbus controller 4 is depicted in FIG. 4. In block 24, the method includes first connecting an I/O module 8 to the fieldbus controller 4. As noted above, this can include connecting an I/O module to an active network or simply detecting a connection upon system being powered on. In block 26, the processor 16 of the fieldbus controller 4 receives a key ID from the I/O module 8, if one had already previously been assigned to the I/O module 8 from a previous connection and configuration with the fieldbus controller 4.

In block 28, the processor compares the received key ID with at least one key ID stored in the memory 15 of the fieldbus controller 4. If no key ID is received, or if the received key ID from the I/O module 8 does not correspond to at least one key ID stored on the memory 15 of the fieldbus controller 4, then the method includes, in block 30, configuring the I/O module 8. Configuring the I/O module may include the steps identified in blocks 32-36, including generating a new key ID by the processor 16 of the fieldbus controller 4, communicating the new key ID to the I/O module, and storing the new key ID on both the fieldbus controller 4 and the I/O module 8.

Once configured, the method further includes, in block 38, concluding that the I/O module 8 is configured and then, in block 40, completing the boot-up procedure of the I/O module 8.

If the received key ID from the I/O module 8 corresponds to at least one key ID stored in the memory 15 of the fieldbus controller 4, then the fieldbus controller 4 will recognize the key ID of the I/O module 8 and immediately retrieve the configuration settings for the I/O module. The method then further includes, in block 38, concluding that the I/O module 8 is configured and retrieving the configuration settings of that I/O module. Once the configuration information is received, then the I/O module 8 completes its boot-up procedure.

Figure 5A:
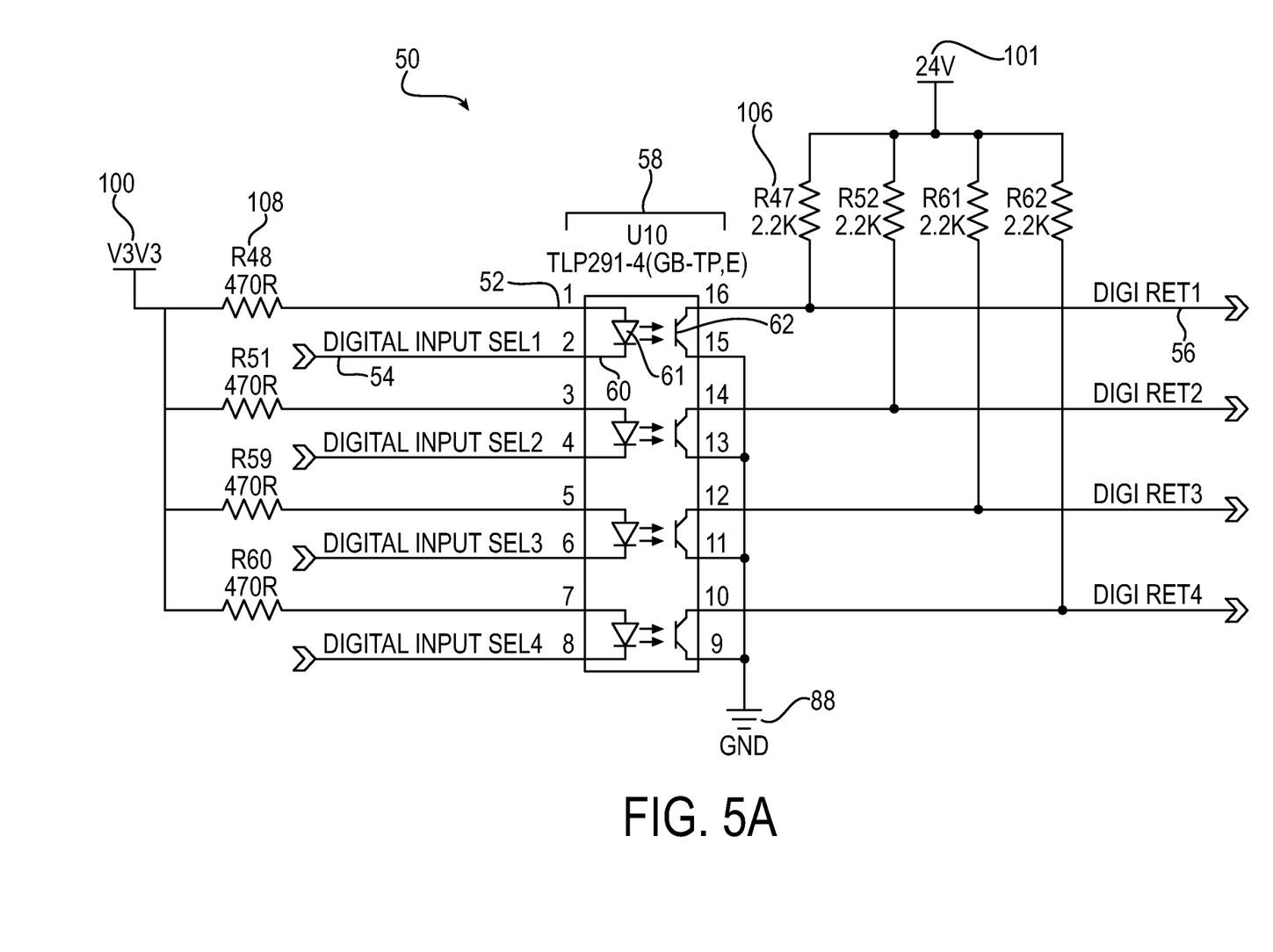
FIGS. 5A-B are schematic circuit diagrams illustrating a circuit for configuring a digital input of a fieldbus controller in accordance with the invention.
Figure 5B:
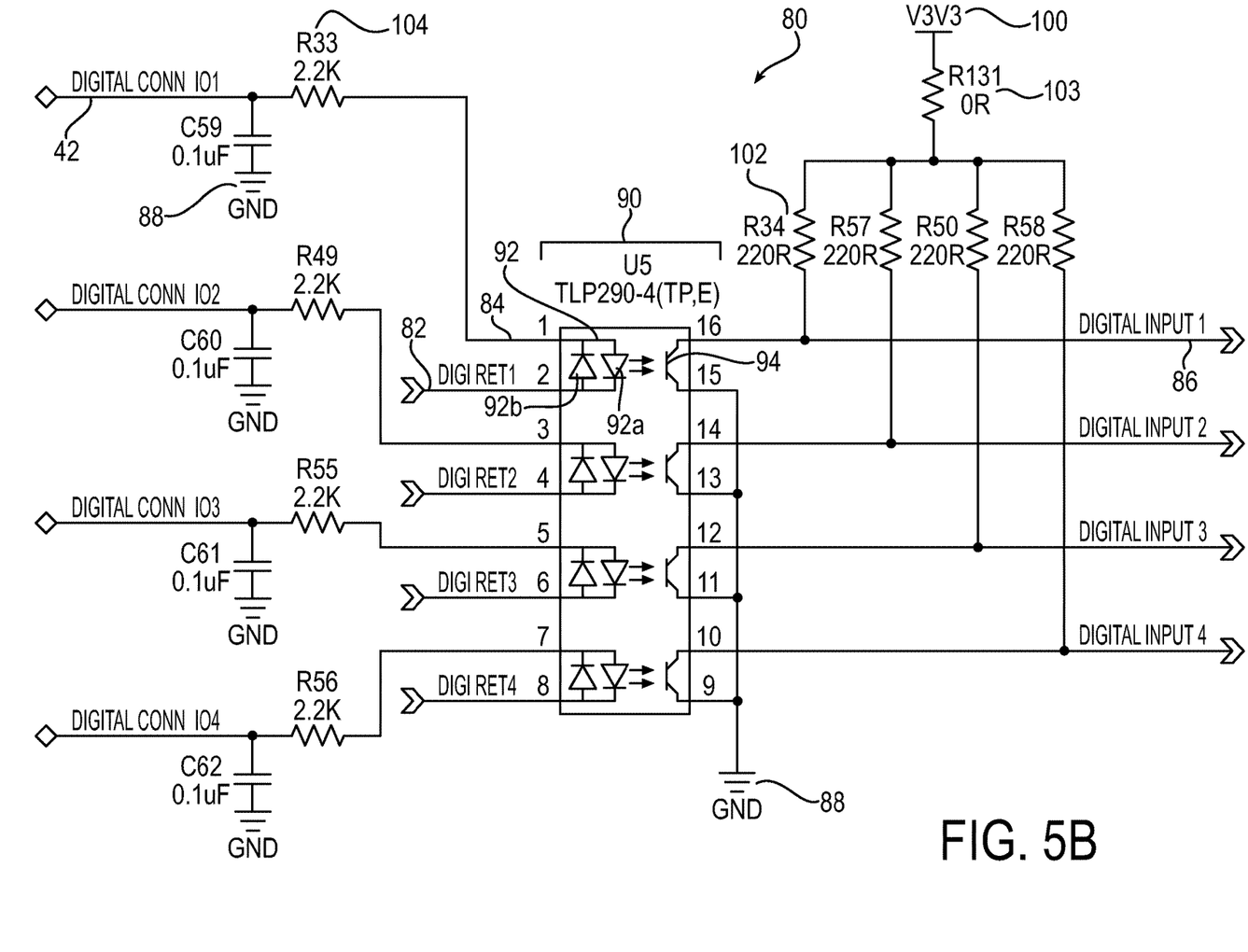

Turning to FIGS. 5A-B, in another aspect of the invention an exemplary circuit 50, 80 for configuring a digital input 42 of an I/O module 8 as either a PNP input or an NPN input is depicted. The circuit 50, 80 comprises a control circuit 50, depicted in FIG. 5A electrically connected to a data circuit 80, depicted in FIG. 5B. The circuit 50, 80 allows the fieldbus controller 4 of the present invention to be connected to I/O modules 8 that are either PNP-type devices or NPN-type devices and detect sensor signals from either type by selectively configuring the digital input 42 of the I/O module 8 as either a PNP input or an NPN input. A user is able to choose a configuration type of the digital input 42 via configuration software provided on a web interface or configuration tool. Once selected, the digital input 42 may be connected to either PNP or NPN devices and the fieldbus controller 4 may obtain data from the devices without changing any hardware on the fieldbus controller 4.

In an exemplary embodiment, depicted in FIG. 5A, the control circuit 50 includes a first selection input 54 for selecting either an NPN mode or a PNP mode of the digital input, depending on the selection chosen by the user on the configuration software. The first selection input 54 corresponds to a user-settable configuration parameter that may be set via a configuration tool of the fieldbus controller. The control circuit 50 also includes a reference input 52 for receiving a reference voltage, wherein a state of the first selection input 54, and thus the mode selected by the first selection input 54, controls the voltage provided at the reference input 52. The control circuit 50 also includes a control output 56 for providing a command indicative of either the NPN mode or the PNP mode selected by the first selection input 54, wherein the command provided by the control output 56 also corresponds to the voltage provided at the reference input 52.

The data circuit 80 comprises a second selection input 82 electrically connected to the control output 56 for receiving the command provided by the control output 56. The control output 56 is operative to connect the second selection input 82 to one of a first voltage level or a second voltage level. In one embodiment, the first voltage level comprises signal common 88 and the second voltage level comprises a prescribed voltage different from signal common 88. The second selection input 82, then, is operative to configure the digital input 42 as either a PNP input or an NPN input, depending on the command received by the control output 56 of the control circuit 50 and the connection of the second selection input 82 to one of a first voltage level or a second voltage level. The data circuit 80 further includes a data input 84 electrically coupled to the digital input 42 and a data output 86 for providing data corresponding to the data input 84. The data transmitted by the data output 86 corresponds to a state of the digital input 42 and allows the fieldbus controller 4 to effectively detect the digital input 42 as either a PNP or NPN input.

In one embodiment, the data circuit 80 comprises a first optocoupler 90. The first optocoupler 90 may comprise a first light emitting device 92 connected between the data input 84 and the second selection input 82, as shown in FIG. 5B. The first light emitting device 92 is operative to selectively emit light based on data provided on the data input 84 and the state of the second selection input 82. The first light emitting device 92 may include a first light emitting diode 92a having an anode connected to the data input 84 and a cathode connected to the second selection input 82 and a second light emitting diode 92b having an anode connected to the second selection input 82 and a cathode connected to the data input 84. The first optocoupler 90 may also comprise a first phototransistor 94 connected to the data output 86 and signal common 88. The first phototransistor 94 selectively couples the data output 86 to signal common 88 based on light emitted from the first light emitting device 92.

In one embodiment, the control circuit 50 comprises a second optocoupler 58. The second optocoupler 58 may be similar to the first optocoupler 90 and may include a second light emitting device 60 connected between the reference input 52 and the first selection input 54. The second light emitting device 60 is operative to selectively emit light based on data provided on the reference input 52 and a state of the first selection input 54. The second light emitting device 60 may comprise a light emitting diode 61 having an anode connected to the reference input 52 and a cathode connected to the first selection input 54. Further, the second optocoupler 58 may also include a second phototransistor 62 connected to the control output 56 and signal common 88. The second phototransistor 62 selectively couples the control output 56 to signal common 88 based on light emitted from the second light emitting device 60.

In one embodiment, the circuit 50, 80 of FIGS. 5A-B may further comprise a first power source 100, a second power source 101 and a plurality of resistors 102, 103, 104, 106, and 108. The circuit may include a first resistor 102 connected between the power source 100 and the data output 86, and a second resistor 104 connected between the data input 84 and the digital input 42, as shown in the data circuit 80 of FIG. 5B. The data circuit 80 may also include an intermediary resistor 103 connected between the first resistor 102 and the power source 100. The circuit 50, 80 may also include a third resistor 106 connected between the power source 101 and the control output 56 and a fourth resistor 108 connected between the reference input 52 and the power source 100, as shown in the control circuit 50 of FIG. 5A.

In operation, the above described circuit 50, 80 enables the digital input 42 of an I/O module 8 on a fieldbus controller 4 to be configured as either an NPN input or a PNP input compatible with either an NPN sensor or a PNP sensor. Both NPN and PNP sensors are three wire devices and have two power leads, one connected to positive supply and one connected to negative. The third wire output connects to the I/O module 8 of a fieldbus controller 4 via the digital input 42. The digital input 42 may be of either sinking type or sourcing type. Sinking type inputs are to be used with PNP sensors while sourcing type inputs are to be used with NPN sensors. With a PNP sensor, the third wire output connected to the digital input 42 connects to the negative pole of the power supply, while with an NPN sensor, the third wire output connected to the digital input 42 connects to the positive pole of the power supply. With the configurable digital input 42 of the present invention, either of these types may be detected by the fieldbus controller 4.

For example, to configure the digital input 42 as a PNP input, the user will select PNP configuration settings on the configuration software. This causes the first selection input 54 to select PNP mode by being set to low. With the first selection input 54 set to low, voltage from the power source 100 is provided at the reference input 52 and current flows through the second light emitting device 60 of the second optocoupler 58 via the light emitting diode 61. As current flows through the second light emitting device 60, light is emitted onto the second phototransistor 62 of the second optocoupler 58, turning the second phototransistor 62 on. With the second phototransistor 62 on, the control output 56 connects the second selection input 82 of the data circuit 80 to signal common 88, effectively providing a command to the second selection input 82 indicative of the PNP mode and causing the second selection input 82 to configure the digital input 42 as a PNP input. The second selection input 82 does this because being connected to signal common 88 causes current to be sourced from the digital input 42 (depending on the state of the digital input 42) to the data input 84 and through the first light emitting device 92 of the first optocoupler 90 via a first light emitting diode 92a. Light is emitted from the first light emitting diode 92a based on a state of the digital input 42 and thus turns the first phototransistor 94 in the first optocoupler 90 on or off based on the state of the digital input 42. Thus, the data output 86 of the data circuit 80 will correspond to the state of the PNP digital input 42.

Alternatively, to configure the digital input 42 as an NPN input, the user will select NPN configuration settings on the configuration software. This causes the first selection input 54 to select NPN mode by being set to high. With the first selection input 54 set to high, no voltage is provided to the reference input 52 and no current flows through the second light emitting device 60 of the second optocoupler 58. Accordingly, the second phototransistor 62 in the second optocoupler 58 remains off. With the second phototransistor 62 off, the control output 56 connects the second selection input 82 of the data circuit 80 to a prescribed voltage, different from signal common 88, effectively providing a command indicative of the NPN mode and causing the second selection input 82 to configure the digital input 42 as an NPN input. The second selection input 82 does this because being connected to the prescribed voltage, different from signal common, causes the digital input 42 to sink current based on a state of the digital input 42, with current flowing from the second selection input 82 to the data input 84, through the first light emitting device 92 of the first optocoupler 90 via a second light emitting diode. Light is emitted from the second light emitting diode 92b based on a state of the digital input 42 and thus turns the first phototransistor 94 in the first optocoupler 90 on or off based on the state of the digital input 42. Accordingly, the circuit of the present invention allows the fieldbus controller 4 to detect either a PNP or an NPN input.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method of determining a configuration state of an I/O module connected to a fieldbus controller via a communication link, the method comprising the steps of:
   receiving from the I/O module via the communication link a key ID,
   upon receiving the key ID, comparing the key ID with at least one key ID stored on the fieldbus controller, and
   configuring the I/O module when the received key ID does not correspond to the at least one key ID stored on the fieldbus controller, wherein the configuring includes:
      generating by the fieldbus controller a new key ID,
      communicating the new key ID to the I/O module, and
      storing the new key ID on the fieldbus controller and the I/O module, and
   concluding the I/O module is configured when the received key ID corresponds to the at least one key ID stored on the fieldbus controller.

2. The method of claim 1, further comprising the step of completing a boot-up procedure of the I/O module.

3. The method of claim 1, wherein the key ID comprises 4-bytes.

4. The method of claim 1, wherein the communication link comprises a controller area network line.

5. A circuit for configuring an I/O module of a fieldbus controller, comprising:
   a digital input of the I/O module, configurable as either a PNP input or an NPN input,
   a control circuit, comprising:
      a reference input for receiving a reference voltage;
      a first selection input for selecting either an NPN mode or a PNP mode of the digital input, wherein a state of the first selection input controls a voltage provided at the reference input;
      a control output for providing an electronic command indicative of either the NPN mode or the PNP mode, wherein the electronic command provided by the control output corresponds to the voltage provided at the reference input; and
   a data circuit, comprising:
      a second selection input electrically connected to the control output for receiving the electronic command provided by the control output, wherein the second selection input is electronically operative to configure the digital input as either a PNP input or an NPN input depending on the electronic command received by the control output;
      a data input electrically coupled to the digital input; and
      a data output for providing data corresponding to the data input,
   wherein the control output is operative to electronically connect the second selection input to one of a first voltage level or a second, different voltage level.

6. The circuit according to claim 5, wherein the first voltage level comprises signal common, and the second voltage level comprises a prescribed voltage different from signal common.

7. The circuit according to claim 5, wherein the data circuit comprises a first optocoupler.

8. The circuit according to claim 7, wherein the first optocoupler comprises a first light emitting device connected between the data input and the second selection input, the first light emitting device operative to selectively emit light based on data provided on the data input.

9. The circuit according to claim 8, wherein the first light emitting device comprises
a first light emitting diode having an anode connected to the data input and a cathode connected to the second selection input, and
a second light emitting diode having an anode connected to the second selection input and a cathode connected to the data input.

10. The circuit according to claim 7, wherein the first optocoupler comprises a first phototransistor connected to the data output and signal common, wherein the first phototransistor selectively couples the data output to signal common based on light emitted from the first light emitting device.

11. The circuit according to claim 5, further comprising:
a first power source;
a first resistor connected between the first power source and the data output; and
a second resistor connected between the data input and the digital input.

12. The circuit according to claim 5, further comprising:
a second power source;
a third resistor connected between the second power source and the control output; and
a fourth resistor connected between the reference input and the first power source.

13. The circuit according to claim 5, wherein the control circuit comprises a second optocoupler.

14. The circuit according to claim 13, wherein the second optocoupler comprises a second light emitting device connected between the reference input and the first selection input, the second light emitting device operative to selectively emit light based on data provided on the reference input.

15. The circuit according to claim 14, wherein the second light emitting device comprises a light emitting diode having an anode connected to the reference input and a cathode connected to the first selection input.

16. The circuit according to claim 13, wherein the second optocoupler comprises a second phototransistor connected to the control output and signal common, wherein the second phototransistor selectively couples the control output to signal common based on light emitted from the second light emitting device.

* * * * *